United States Patent
Carrotte et al.

(10) Patent No.: US 10,295,188 B2
(45) Date of Patent: May 21, 2019

(54) FUEL INJECTOR FOR A GAS TURBINE ENGINE COMBUSTION CHAMBER

(71) Applicant: ROLLS-ROYCE plc, London (GB)

(72) Inventors: Jonathan F Carrotte, Leicester (GB); Christopher L Ford, Somerset (GB)

(73) Assignee: ROLLS-ROYCE plc, London (GB)

( * ) Notice: Subject to any disclaimer, the term of this patent is extended or adjusted under 35 U.S.C. 154(b) by 334 days.

(21) Appl. No.: 15/247,340

(22) Filed: Aug. 25, 2016

(65) Prior Publication Data

US 2017/0089582 A1  Mar. 30, 2017

(30) Foreign Application Priority Data

Sep. 25, 2015 (GB) .................................. 1516977.4

(51) Int. Cl.
*F23R 3/16* (2006.01)
*F23R 3/14* (2006.01)
(Continued)

(52) U.S. Cl.
CPC .................. *F23R 3/16* (2013.01); *F02C 3/04* (2013.01); *F23R 3/14* (2013.01); *F23R 3/286* (2013.01); *F23R 3/343* (2013.01); *F05D 2240/35* (2013.01); *F05D 2260/14* (2013.01); *F23C 2900/07001* (2013.01); *F23D 2900/11101* (2013.01)

(58) Field of Classification Search
CPC ............... F23R 3/14; F23R 3/16; F23R 3/286
See application file for complete search history.

(56) References Cited

U.S. PATENT DOCUMENTS 6,908,303 B1   6/2005 Oda et al.
8,661,779 B2 * 3/2014 Laster .................... F23C 7/004
                                                              60/39.463
(Continued)

FOREIGN PATENT DOCUMENTS

CN    104406196 A    3/2015
EP    2 703 720 A2   3/2014
(Continued)

OTHER PUBLICATIONS

Jan. 19, 2017 Extended Search Report issued in European Patent Application No. 16185750.3.
(Continued)

*Primary Examiner* — Arun Goyal
(74) *Attorney, Agent, or Firm* — Oliff PLC

(57) ABSTRACT

A fuel injector includes a central member arranged on axis of fuel injector and a first member arranged around central member. A first swirler is arranged between central member and first member. A pilot fuel injector is arranged to supply fuel onto inner surface of first member. A second member is arranged between downstream end of first member and downstream end of shroud. A second swirler is arranged between upstream end of first member and upstream end of shroud and between downstream end of first member and upstream end of second member. A third swirler is arranged between downstream end of shroud and second member. A main fuel injector is arranged to supply fuel into an annular passage between first member and second member and a fourth swirler extends through first member.

24 Claims, 7 Drawing Sheets

(51) Int. Cl.
*F23R 3/28* (2006.01)
*F23R 3/34* (2006.01)
*F02C 3/04* (2006.01)

(56) References Cited

U.S. PATENT DOCUMENTS

| | | |
|---|---|---|
| 9,046,039 B2 * | 6/2015 | Williams .................. F02C 7/22 |
| 9,371,990 B2 * | 6/2016 | Moran ....................... F23R 3/14 |
| 2010/0205971 A1 | 8/2010 | Williams et al. |
| 2010/0308135 A1 | 12/2010 | Yamamoto et al. |
| 2011/0005232 A1 | 1/2011 | Williams et al. |
| 2012/0047903 A1 | 3/2012 | Williams et al. |
| 2014/0157781 A1 | 6/2014 | Moran et al. |

FOREIGN PATENT DOCUMENTS

| | | |
|---|---|---|
| EP | 2 743 857 A1 | 6/2014 |
| EP | 2772688 A2 | 9/2014 |
| EP | 2 853 817 A1 | 4/2015 |
| GB | 2 439 097 A | 12/2007 |

OTHER PUBLICATIONS

Feb. 29, 2016 Search Report issued in British Patent Application No. GB1516977.4.

\* cited by examiner

FUEL INJECTOR FOR A GAS TURBINE ENGINE COMBUSTION CHAMBER

The present disclosure relates to a fuel injector and to a fuel injector for a gas turbine engine combustion chamber and in particular to a lean burn fuel injector and to a lean burn fuel injector for a gas turbine engine combustion chamber.

Lean burn fuel injectors comprise a pilot fuel injector and a main fuel injector and a plurality of air swirlers to atomise the fuel.

There are a number of problems associated with current lean burn fuel injectors. When installed within a gas turbine engine combustion chamber the fuel injector is supplied with air by a compressor via a diffuser. Due to the size mismatch between the diffuser and the fuel injector and the relatively short axial distance between the diffuser and the fuel injector there may be significant inhomogeneity in the airflow to the fuel injector leading to deleterious emissions performance due to inhomogeneous regions of combustion within the combustion chamber.

The vanes of the air swirlers may be flat or bent plates, which are cheap to manufacture but provide a significant source of total pressure loss. Alternatively, the vanes of the air swirlers may be aerodynamically profiled but these are difficult to manufacture due to their size and are expensive to manufacture.

In operation the vanes of the air swirlers may be supplied with air with a range of incidence angles. Small vanes with relatively thin leading edges only have a narrow operating range and therefore are sensitive to changes in the incidence angle of the air flow.

Each of the air swirlers may have a large number of vanes to enable the air flow to be turned within a short axial distance. However, surface friction at the surface of the vanes produces losses. Therefore, pressure losses may be reduced by reducing the number of vanes in the air swirlers.

In order to supply fuel to the pilot fuel injector a fuel feed arm extends across the main air path of the fuel injector and this provides a source of local non uniformity of air flow as well as a total pressure loss.

According to a first aspect of the disclosure there is provided a fuel injector comprising a pilot fuel injector, a main fuel injector and a plurality of air swirlers, wherein a shroud is arranged around the pilot fuel injector, the main fuel injector and the plurality of air swirlers, the fuel injector has an axis, the shroud has a radially inner surface, a central member arranged on the axis of the fuel injector, a first member arranged coaxially around the central member, a first air swirler arranged radially between the central member and the first member, the pilot fuel injector arranged within the first member to supply fuel into a passage at least defined by the first member, a second member arranged coaxially between a downstream portion of the first member and a downstream portion of the shroud, a second air swirler arranged radially between an upstream portion of the first member and an upstream portion of the shroud and radially between a downstream portion of the first member and the second member, the second air swirler comprising a plurality of circumferentially spaced vanes, each of the vanes of the second air swirler extending radially from the upstream portion of the first member to the upstream portion of the shroud and from the downstream portion of the first member to the second member, a third air swirler arranged radially between the downstream portion of the shroud and the second member, the main fuel injector arranged to supply fuel into an annular passage between the first member and the second member and a fourth air swirler extending through the first member.

The pilot fuel injector may be arranged to supply fuel onto the radially inner surface of the first member. The pilot fuel injector may be arranged within the first member.

The radially inner surface of the shroud may be generally circular in cross-section in a plane perpendicular to the axis of the fuel injector at the downstream end of the shroud, the radially inner surface of the shroud is generally non-circular in cross-section in a plane perpendicular to the axis of the fuel injector at the upstream end of the shroud and has different dimensions in two mutually perpendicular directions.

The radially inner surface of the shroud may be generally elliptical, oval, kidney shaped, oblong or rectangular in cross-section in a plane perpendicular to the axis of the fuel injector at the upstream end of the shroud.

The radially inner surface of the shroud may change from being circular in cross-section in a plane perpendicular to the axis of the fuel injector at the downstream end of the shroud to being generally non-circular in cross-section in a plane perpendicular to the axis of the fuel injector at the upstream end of the shroud.

The radially inner surface of the shroud may be generally circular in cross-section in a plane perpendicular to the axis of the fuel injector at an inlet to an annular passage formed between the second member and the downstream end of the shroud.

The radially inner surface of the shroud may change from being circular in cross-section in a plane perpendicular to the axis of the fuel injector at the inlet to the annular passage formed between the second member and the downstream end of the shroud to being generally non-circular in cross-section in a plane perpendicular to the axis of the fuel injector at the upstream end of the shroud.

The upstream end of the shroud and the upstream end of the first member may be arranged in a common plane perpendicular to the axis of the fuel injector.

The second air swirler may comprise a plurality of circumferentially/angularly spaced vanes extending radially from the first member to the shroud and from the first member to the second member.

The vanes may extend axially from the upstream ends of the shroud and first member to a position upstream of the main fuel injector.

There may be a relatively small number of vanes and the vanes may be relatively thick compared to the prior art. There may be six vanes.

The radially outer ends of the vanes may be circumferentially displaced relative to the radially inner ends of the vanes.

One of the vanes may have a first passage extending radially there-through to supply fuel to the pilot fuel injector.

One of the vanes may have a second passage extending there-through to supply fuel to the main fuel injector.

All of the vanes may have a second passage extending there-through to supply fuel to the main fuel injector.

The main fuel injector may be arranged to supply fuel onto the inner surface of the second member.

Alternatively each of the vanes may have apertures in the pressure surface to act as the main fuel injector.

The fourth air swirler comprising a plurality of ports extending through the first member. The ports may have inlets arranged tangentially to the outer surface of the first member and the ports extend with axial and circumferential components through the first member.

The third air swirler may comprise a portion of each of the vanes of the second air swirler, the portion of each of the vanes of the second air swirler is arranged between the downstream portion of the shroud and the second member.

The skilled person will appreciate that except where mutually exclusive, a feature described in relation to any one of the above aspects of the invention may be applied mutatis mutandis to any other aspect of the invention.

Embodiments of the disclosure will now be described by way of example only, with reference to the Figures, in which.

Figure 1:
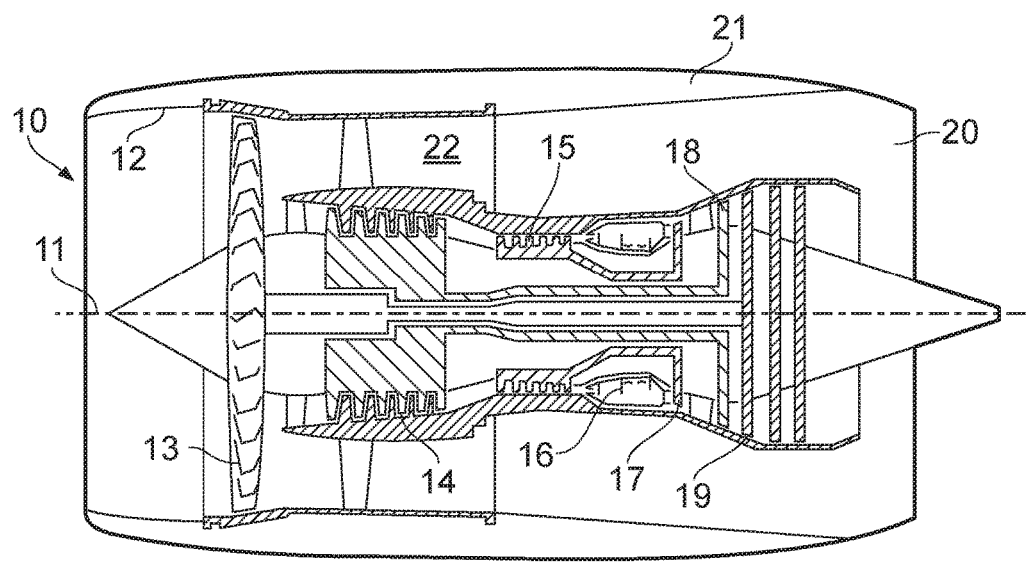
FIG. 1 is a cross-sectional view of a turbofan gas turbine engine having a fuel injector according to the present disclosure.

With reference to FIG. 1, a turbofan gas turbine engine is generally indicated at 10, having a principal and rotational axis 11. The engine 10 comprises, in axial flow series, an air intake 12, a propulsive fan 13, an intermediate pressure compressor 14, a high-pressure compressor 15, combustion equipment 16, a high-pressure turbine 17, and intermediate pressure turbine 18, a low-pressure turbine 19 and an exhaust nozzle 20. A nacelle 21 generally surrounds the engine 10 and defines both the intake 12 and the exhaust nozzle 20.

The gas turbine engine 10 works in the conventional manner so that air entering the intake 12 is accelerated by the fan 13 to produce two air flows: a first air flow into the intermediate pressure compressor 14 and a second air flow which passes through a bypass duct 22 to provide propulsive thrust. The intermediate pressure compressor 14 compresses the air flow directed into it before delivering that air to the high pressure compressor 15 where further compression takes place.

The compressed air exhausted from the high-pressure compressor 15 is directed into the combustion equipment 16 where it is mixed with fuel and the mixture combusted. The resultant hot combustion products then expand through, and thereby drive the high, intermediate and low-pressure turbines 17, 18, 19 before being exhausted through the nozzle 20 to provide additional propulsive thrust. The high 17, intermediate 18 and low 19 pressure turbines drive respectively the high pressure compressor 15, intermediate pressure compressor 14 and fan 13, each by suitable interconnecting shaft.

Figure 2:
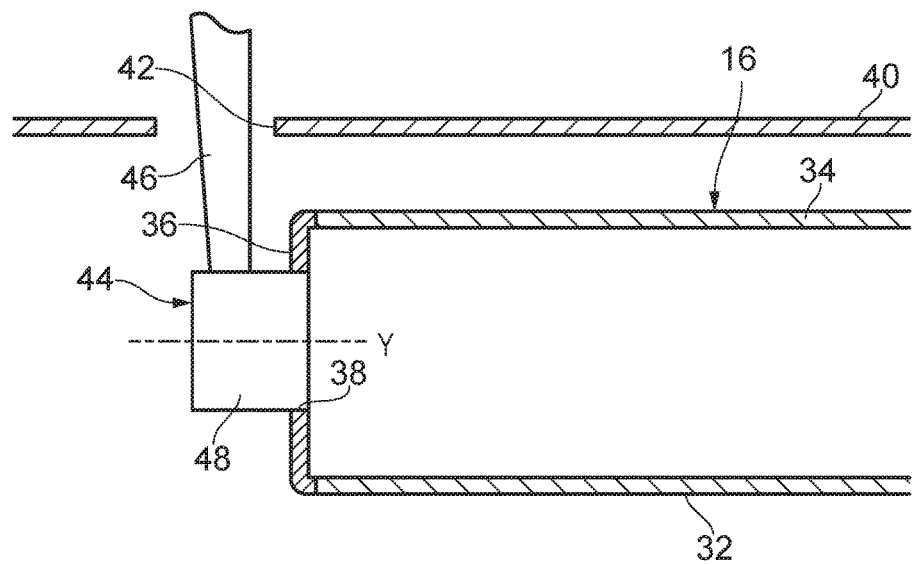
FIG. 2 is an enlarged cross-sectional view through a gas turbine engine combustion chamber having a fuel injector according to the present disclosure.
Figure 3:
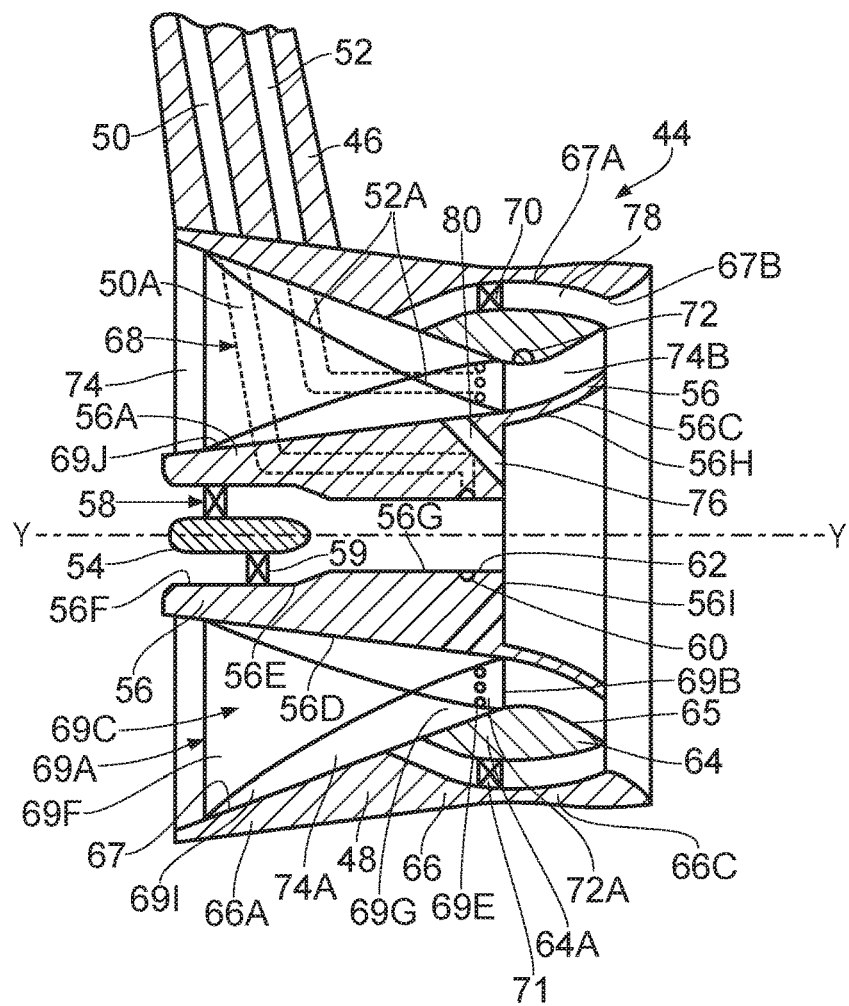
FIG. 3 is a further enlarged cross-sectional view through a fuel injector according to the present disclosure.
Figure 6:
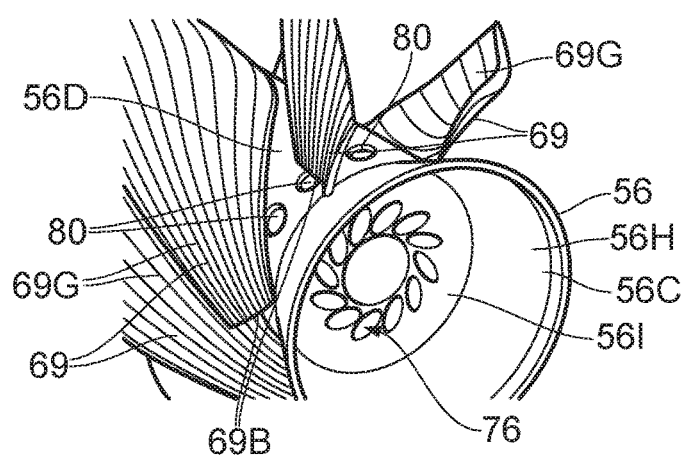
FIG. 6 is a perspective view of the outlet of the fuel injector shown in FIG. 3.
Figure 4:
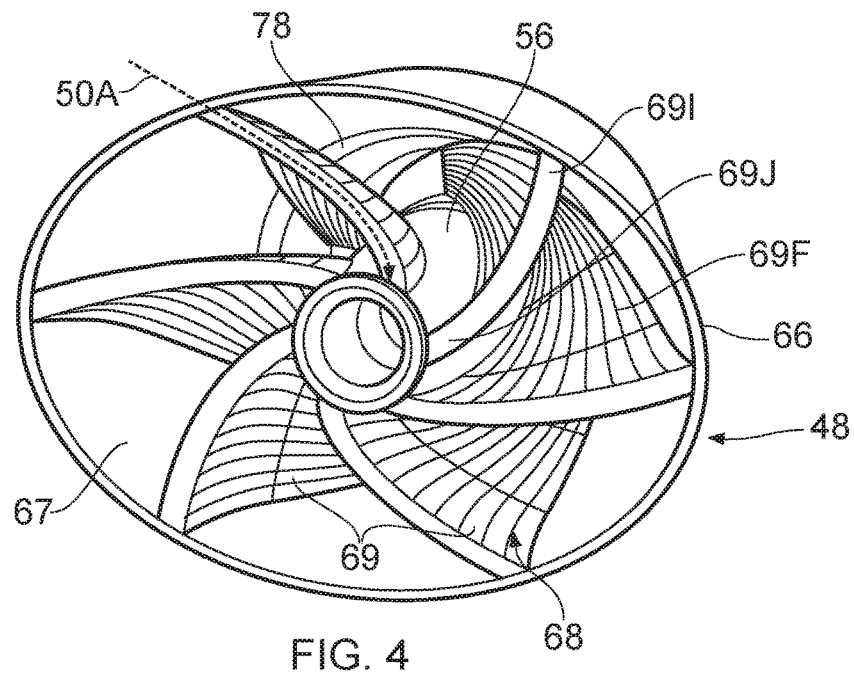
FIG. 4 is a perspective view of the inlet of the fuel injector shown in FIG. 3.
Figure 5:
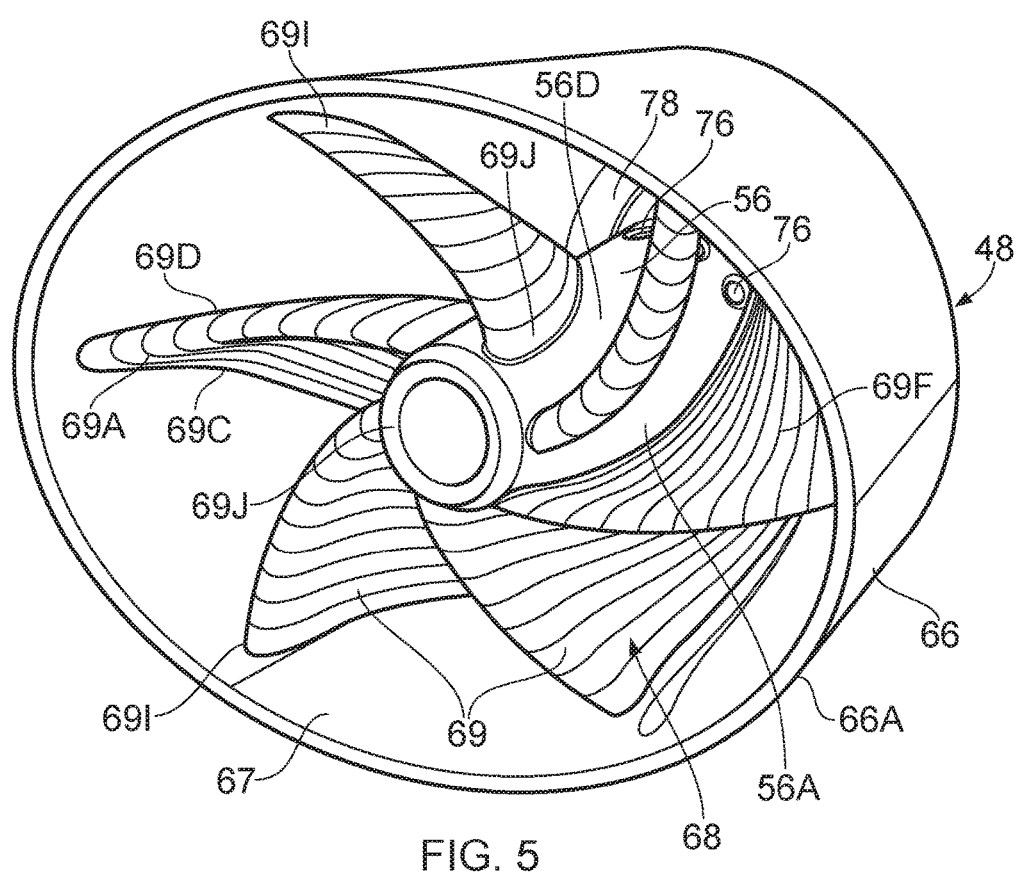
FIG. 5 is a further perspective view of a portion of the inlet of the fuel injector shown in FIG. 3.

The combustion equipment 16 is shown more clearly in FIG. 2. The combustion equipment 16 comprises an annular combustion chamber which comprises an inner annular wall 32, an outer annular wall 34 and an upstream wall 36. The upstream end wall 36 has a plurality of circumferentially spaced apertures, for example equi-circumferentially spaced apertures, 38. The combustion chamber is surrounded by a combustion chamber casing 40 and the combustion chamber casing 40 has a plurality of circumferentially spaced apertures 42. The combustion chamber also has a plurality of fuel injectors 44 and each fuel injector 44 extends radially through a corresponding one of the apertures 42 in the combustion chamber casing 40 and locates in a corresponding one of the apertures 38 in the upstream end wall 36 of the combustion chamber to supply fuel into the combustion chamber.

A fuel injector 44 according to the present disclosure is shown more clearly in FIGS. 3 to 6. The fuel injector 44 comprises a fuel feed arm 46 and a fuel injector head 48. The fuel feed arm 46 has a first internal fuel passage 50 for the supply of pilot fuel to the fuel injector head 48 and a second internal fuel passage 52 for the supply of main fuel to the fuel injector head 48. The fuel injector head 48 has an axis Y and the fuel feed arm 46 extends generally radially with respect to the axis Y of the fuel injector head 48 and also generally radially with respect to the axis 11 of the turbofan gas turbine engine 10. The axis Y of each fuel injector head 48 is generally aligned with the axis of the corresponding aperture 38 in the upstream end wall 36 of the combustion chamber 15.

The fuel injector 44 comprises a pilot fuel injector 60, a main fuel injector 72, a plurality of air swirlers 58, 68, 70 and 76 and a shroud 66, wherein the shroud 66 is arranged around the pilot fuel injector 60, the main fuel injector 72 and the plurality of air swirlers 58, 68, 70 and 76. The shroud 66 has a radially inner surface 67 and the radially inner surface 67 of the shroud 66 is generally circular in cross-section in a plane perpendicular to the axis Y of the fuel injector head 48 at the downstream end of the shroud 66. The radially inner surface 67 of the shroud 66 is generally non-circular in cross-section in a plane perpendicular to the axis Y of the fuel injector head 48 at the upstream end of the shroud 66 and has different dimensions in two mutually perpendicular directions. A central member 54 is arranged on the axis Y of the fuel injector head 48. A first member 56 is arranged coaxially around the central member 54 and a first air swirler 58 is arranged radially between the central member 54 and the first member 56. The first air swirler 58 comprises a plurality of circumferentially, angularly, spaced vanes 59 extending radially from the central member 54 to the first member 56. The vanes 59 interconnect the central member 54 and the first member 56. A pilot fuel injector 60 is arranged to supply fuel into a passage at least defined by the first member 56, e.g. by an inner surface 62 of the first member 56. In this example the pilot fuel injector 60 is arranged within the first member 56 to supply fuel onto the inner surface 62 of the first member 56. A second member 64 is arranged coaxially between a downstream portion 56C of the first member 56 and a downstream portion 66C of the shroud 66. A second air swirler 68 is arranged radially between an upstream portion 56A of the first member 56 and an upstream portion 66A of the shroud 66 and between a downstream portion 56C of the first member 56 and an upstream portion 64A of the second member 64. A third air swirler 70 is arranged in an annular passage 78 between the downstream portion 66C of the shroud 66 and the second member 64. The third air swirler 70 comprises a plurality of circumferentially, angularly, spaced vanes 71 extending radially from the second member 64 to the shroud 66. The vanes 71 interconnect the second member 64 and the shroud 66. The main fuel injector 72 is arranged to supply fuel into an annular passage 74 between the downstream portion 56C of the first member 56 and the second member 64 and a fourth air swirler 76 extends through the first member 56.

The radially inner surface 67 of the shroud 66 is generally elliptical, oval, kidney shaped, oblong or rectangular in cross-section in a plane perpendicular to the axis Y of the fuel injector head 48 at the upstream end of the shroud 66. The radially inner surface 67 of the shroud 66 changes from being circular in cross-section in a plane perpendicular to the axis Y of the fuel injector head 48 at the downstream end of the shroud 66 to being generally non-circular in cross-section in a plane perpendicular to the axis Y of the fuel injector head 48 at the upstream end of the shroud 66. The radially inner surface 67 of the shroud 66 is generally circular in cross-section in a plane perpendicular to the axis Y of the fuel injector head 48 at an inlet to the annular passage 78 formed between the second member 64 and the downstream portion 66C of the shroud 66. The radially inner surface 67 of the shroud 66 changes from being circular in cross-section in a plane perpendicular to the axis Y of the fuel injector head 48 at the inlet to the annular passage 78 formed between the second member 64 and the downstream portion 66C of the shroud 66 to being generally non-circular in cross-section in a plane perpendicular to the axis Y of the fuel injector head 48 at the upstream portion 66A of the shroud 66.

The upstream end of the shroud 66 and the upstream end of the first member 56 are arranged in a common plane perpendicular to the axis Y of the fuel injector head 48. The upstream end of the shroud 66 and the upstream end of the first member 56 may be arranged in axially spaced planes perpendicular to the axis of the fuel injector 48, for example the upstream end of the shroud 66 may be arranged in a plane upstream of the upstream end of the first member 56 or the upstream end of the first member 56 may be upstream of the upstream end of the shroud 66.

The second air swirler 68 comprises a plurality of circumferentially, angularly, spaced vanes 69 extending radially from the first member 56 to the shroud 66 and from the first member 56 to the second member 64. The vanes 69 interconnect the first member 56 and the shroud 66 and interconnect the first member 56 and the second member 64. Each vane 69 has a leading edge 69A, a trailing edge 69B, a pressure surface 69C extending from the leading edge 69A to the trailing edge 69B and a suction surface 69D extending from the leading edge 69A to the trailing edge 69B.

The vanes 69 extend axially from adjacent the upstream ends of the shroud 66 and the first member 56 to a position upstream of the main fuel injector 72, e.g. from the upstream ends of the shroud 66 and the first member 56 or from a position downstream of the upstream ends of the shroud 66 and the first member 56. The leading edges 69A of each vane 69 are positioned at or axially downstream of the upstream ends of the shroud 66 and the first member 56. The trailing edges 69B of the vanes 69 are positioned axially between the upstream and downstream ends of the second member 64. There is a relatively small number of vanes 69 and the vanes 69 have a relatively long chord length and are relatively thick compared to the prior art vanes. In this example there are six vanes 69, but other suitable number of vanes 69 may be used, e.g. four, five, seven or eight. The radially outer ends 69I of the vanes 69 are circumferentially, angularly, displaced, or leant, relative to the radially inner ends 69J of the vanes 69. The vanes 69 are also curved between their radially inner ends 69J and their radially outer ends 69I and in particular the pressure surface 69C is concave in both an axial direction and a radial direction and the suction surface 69D is convex in both an axial direction and a radial direction. Thus, each of the vanes 69 has a first, upstream, portion 69F and a second, downstream, portion 69G and the first portion 69F extends radially between the first member 56 and the shroud 66 and the second portion 69G extends radially between the first member 56 and the second member 64. The upstream portion 69F of each of the vanes 69 extends radially between the upstream portion 56A of the first member 56 and the upstream portion 66A of the shroud 66 and the downstream portion 69G of each of the vanes 69 extends radially between the downstream portion 56C of the first member 56 and the second member 64.

The upstream portion 56A of the first member 56 extends in an upstream direction from a plane perpendicular to the axis Y of the fuel injector 44 at the upstream end of the second member 64 and the downstream portion 56C of the first member 56 extends in a downstream direction from the plane perpendicular to the axis Y of the fuel injector 44 at the upstream end of the second member 64.

One of the vanes 69 has a first passage 50A extending radially there-through to supply fuel to the pilot fuel injector 62. One of the vanes 69 has a second passage 52A extending there-through to supply fuel to the main fuel injector 72. The passages 50A and 52A may be in the same vane 69 or the passages 50A and 52A may be in different vanes 69. The main fuel injector 72 is arranged to supply fuel onto the inner surface 65 of the second member 64.

In another arrangement all of the vanes 69 have a second passage 52A extending there-through to supply fuel to the main fuel injector 72. In this arrangement each of the vanes 69 has apertures 69E in the pressure surface of the vane 69 to supply fuel into the annular passage 74 between the first member 56 and the second member 64 and to act as the main fuel injector 72.

The fourth air swirler 76 comprises a plurality of ports, or passages, 80 extending through the first member 56. The ports 80 have inlets arranged tangentially to the radially outer surface 56D of the first member 56 and the ports 80 extend with axial and circumferential components through the first member 56.

The radially outer surface 56D of the first member 56 is generally circular in cross-section in a plane perpendicular to the axis Y of the fuel injector head 48. The diameter of the radially outer surface 56D of the first member 56 increases from the upstream end to the downstream end of the first member 56.

The diameter of the radially inner surface 67 of the shroud 66 decreases from the upstream end of the shroud 66 to the inlet to the annular passage 78 formed between the second member 64 and the downstream end of the shroud. The diameter of the radially inner surface 67 of the shroud 66 increases from the inlet of the annular passage 78 to a predetermined diameter. The radially inner surface 67 of the shroud 66 comprise a cylindrical surface 67A at the predetermined diameter. The radially inner surface 67 of the shroud 66 decreases in diameter from the predetermined diameter to a nose 67B and then increases in diameter from the nose 67B to the downstream end of the shroud 66.

The radially inner surface of the second member 64 decreases in diameter from the inlet of the annular passage 78 at the upstream end of the second member 64 to a minimum diameter and then increases in diameter from the minimum diameter to the downstream end of the second member 64. The radially outer surface of the second member 64 increases in diameter from the inlet of the annular passage 78 at the upstream end of the second member 64 to a maximum diameter. The radially outer surface of the second member 64 has a cylindrical portion at the maximum diameter. The radially outer surface of the second member 64 decreases in diameter from the cylindrical portion to the downstream end of the second member 64.

The downstream end of the second member 64 and the nose 67B of the shroud 66 are arranged in a common plane perpendicular to the axis Y of the fuel injector head 48. The downstream end of the first member 56 and the downstream end of the second member 64 are arranged in a common plane perpendicular to the axis Y of the fuel injector head 48. The downstream end of the second member 64 and the nose 67B of the shroud 66 may be arranged in axially spaced planes perpendicular to the axis of the fuel injector 48, for example the downstream end of the second member 66 may be arranged in a plane upstream of the nose 67B of the shroud 66 or the nose 67B of the shroud 66 may be upstream of the downstream end of the second member 64. The downstream end of the first member 56 and the downstream end of the second member 64 may be arranged in axially spaced planes perpendicular to the axis of the fuel injector 48, for example the downstream end of the first member 56 may be arranged in a plane upstream of the downstream end of the second member 64 or the downstream end of the second member 64 may be upstream of the downstream end of the first member 66.

The central member 54 is arranged radially within the upstream portion 56A of the first member 56. The radially inner surface 56E of the first member 56 has a first diameter at an upstream portion 56F of the radially inner surface of the first member 56, a second minimum diameter at an intermediate portion 56G of the radially inner surface of the first member 56. At the junction between the downstream end of the intermediate portion 56G and a downstream portion 56H of the radially inner surface of the first member 56, the first member 56 has a radially extending surface 56I. The ports, or passages, 80 of the fourth air swirler 76 extend through the first member 56 from the radially outer surface 56D to the radially extending surface 56I. The radially inner surface 56E of the downstream portion 56H of the first member 56 increases in diameter from the intermediate portion 56G to the downstream end of the first member 56.

The relatively long and relatively thick vanes of the second air swirler 68 approximately maintain the space to chord ratio of existing fuel injectors in order to provide the same degree of swirl to the air flowing there-through. The vanes of the second air swirler 68 are designed to provide the same degree of swirl as a conventional design. The vanes of the second air swirler 68 have a low hub to tip radius ratio and so the space to chord ratio may vary.

It is to be noted that the annular passage 74 extends the full length axial length of the fuel injector head 48. The annular passage 74 has an upstream portion 74A defined radially between the upstream portion 56A of the first member 56 and the upstream portion 66A of the shroud 66 and a downstream portion 74B defined radially between the downstream portion 56C of the first member 56 and the second member 64. The annular passage 74 forms the main inner swirler passage for the main fuel injector 72 and the annular passage 78 forms the main outer swirler passage for the main fuel injector 72. It is seen that the air for the main outer swirler passage, annular passage 78, is ducted off, part of the way along the main inner swirler passage, annular passage 74.

The radially inner surface 65 of the second member 64 is generally circular in cross-section in a plane perpendicular to the axis Y of the fuel injector from a position upstream of the position of the main fuel injector 72 to the downstream end of the second member 64. The remainder of the radially inner surface 65 of the second member 64 to the upstream end of the second member 64 may be circular in cross-section in a plane perpendicular to the axis Y of the fuel injector. Alternatively, the radially inner surface 65 of the second member 64 at the upstream end of the second member 64 may be elliptical in cross-section in a plane perpendicular to the axis Y of the fuel injector and the radially inner surface 65 of the second member 64 transitions to a circular cross-section in a plane perpendicular to the axis Y of the fuel injector to the position upstream of the main fuel injector 72. If the main fuel injector 72 is positioned downstream of the trailing edges 69B of vanes 69 of the second air swirler 68, the radially inner surface 65 of the second member 64 is generally circular in cross-section in a plane perpendicular to the axis Y of the fuel injector at the downstream of the trailing edges 69B of the vanes 69 of the second air swirler 68. However, if the main fuel injector 72 is provided in the vanes 69 of the second air swirler 68, the radially inner surface 65 of the second member 64 is generally circular from a position upstream of the trailing edges 69B of the vanes 69 of the second air swirler 68 and upstream of the position of the main fuel injector 72.

The radially inner surface 67 of the shroud 66 may be circular in cross-section in a plane perpendicular to the axis Y of the fuel injector at the inlet to the annular passage 78 and throughout the full length of the annular passage 78 to the downstream end of the shroud 66 and the radially outer surface of the second member 64 may be circular in cross-section in a plane perpendicular to the axis Y of the fuel injector throughout the full length of the annular passage 78 from the upstream end to the downstream end of the second member 64. Alternatively, radially inner surface 67 of the shroud 66 may be circular in cross-section in a plane perpendicular to the axis Y of the fuel injector for a downstream portion of the annular passage 78 to the downstream end of the shroud 66 and the radially outer surface of the second member 64 may be circular in cross-section in a plane perpendicular to the axis Y of the fuel injector for the downstream portion of the annular passage 78 to the downstream end of the second member 64.

It is also to be noted that the passage extending coaxially through the first member forms the pilot inner swirler passage for the pilot fuel injector 62 and the ports 80 through the first member 56 from the pilot outer swirler passage for the pilot fuel injector 62. It is seen that the air for the pilot outer swirler passage is ducted off, part of the way along the main inner swirler passage, annular passage 74.

It is to be noted that the cross-sectional area of the main inner swirler passage 74 defined between the elliptical radially inner surface of the shroud 66 in cross-section in a plane perpendicular to the axis Y of the fuel injector head 48 and the radially outer surface 56D of the first member 56 at the upstream end of the shroud 66 is significantly larger than the cross-sectional areas of the annular passages 74 and 78 in a plane perpendicular to the axis Y of the fuel injector head 48 at the downstream end of the shroud 66. Hence the air flow through the fuel injector head 48 undergoes an axial acceleration as it flows through the fuel injector head 48 which helps to aerodynamically off-load the turning vanes.

In operation pilot fuel is supplied through the pilot fuel passages 50 and 50A to the pilot fuel injector 62 in the first member 56. The pilot fuel is supplied onto the intermediate portion 56G of the radially inner surface 56E of the first member 56 to form a film of pilot fuel. Air is supplied through the first air swirler 58 and the fourth air swirler 76 to atomise the pilot fuel which is then supplied into the combustion chamber 16. When the main fuel injector 72 is in use the main fuel is supplied through the main fuel passages 52 and 52A to the main fuel injector 72. The main fuel is supplied onto the radially inner surface 65 of the second member 64 to form a film of main fuel. Air is supplied through the second air swirler 68 and the third air swirler 70 to atomise the main fuel which is then supplied into the combustion chamber 16.

It is to be noted in this embodiment that the air flow in the second air swirler 68, the third air swirler 70 and the fourth air swirler 76 are all swirled in the same direction. The air flow through the first air swirler 58 may be arranged to swirl in the same direction or the opposite direction to the air flow through the second, third and fourth air swirlers 68, 70 and 76.

Figure 7:
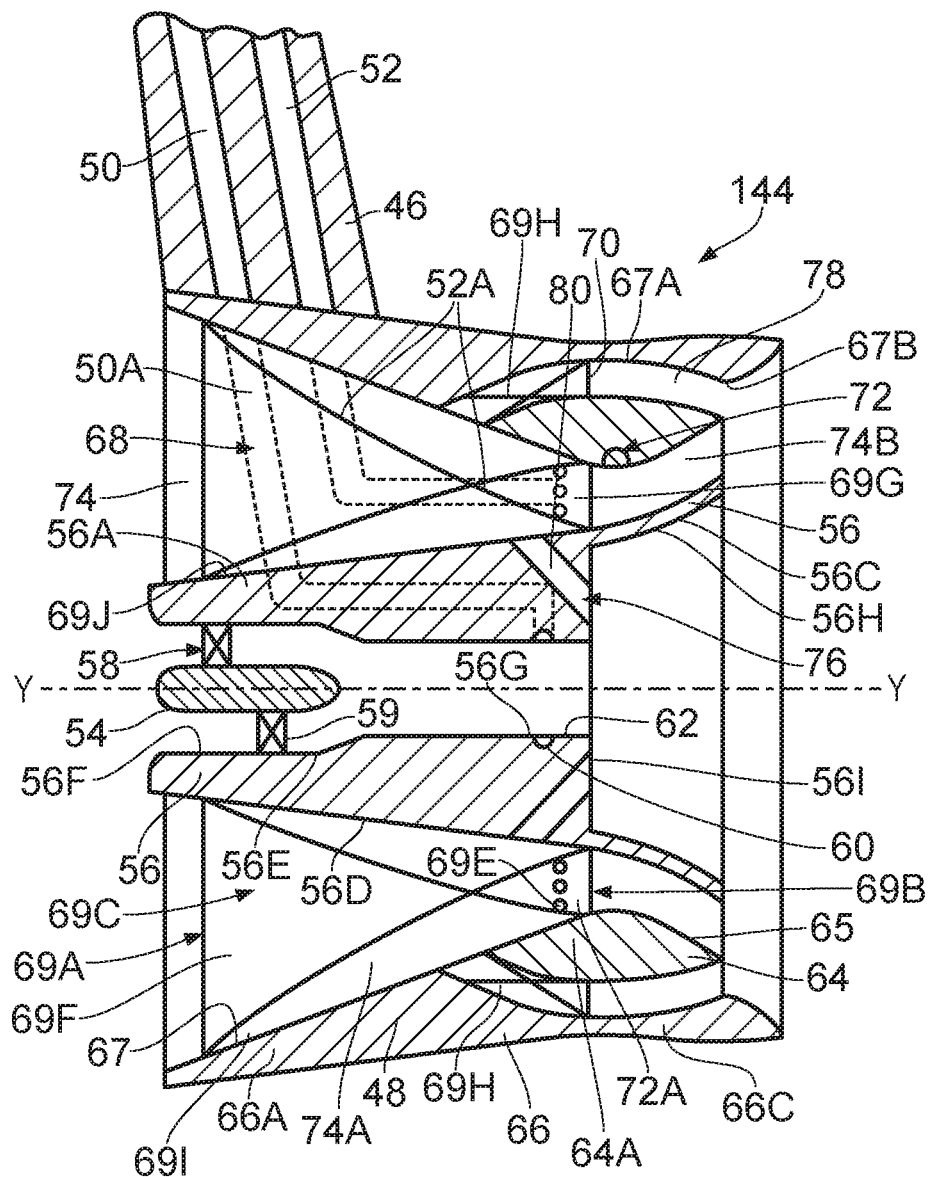
FIG. 7 is a further enlarged cross-sectional view through a further fuel injector according to the present disclosure.
Figure 8:
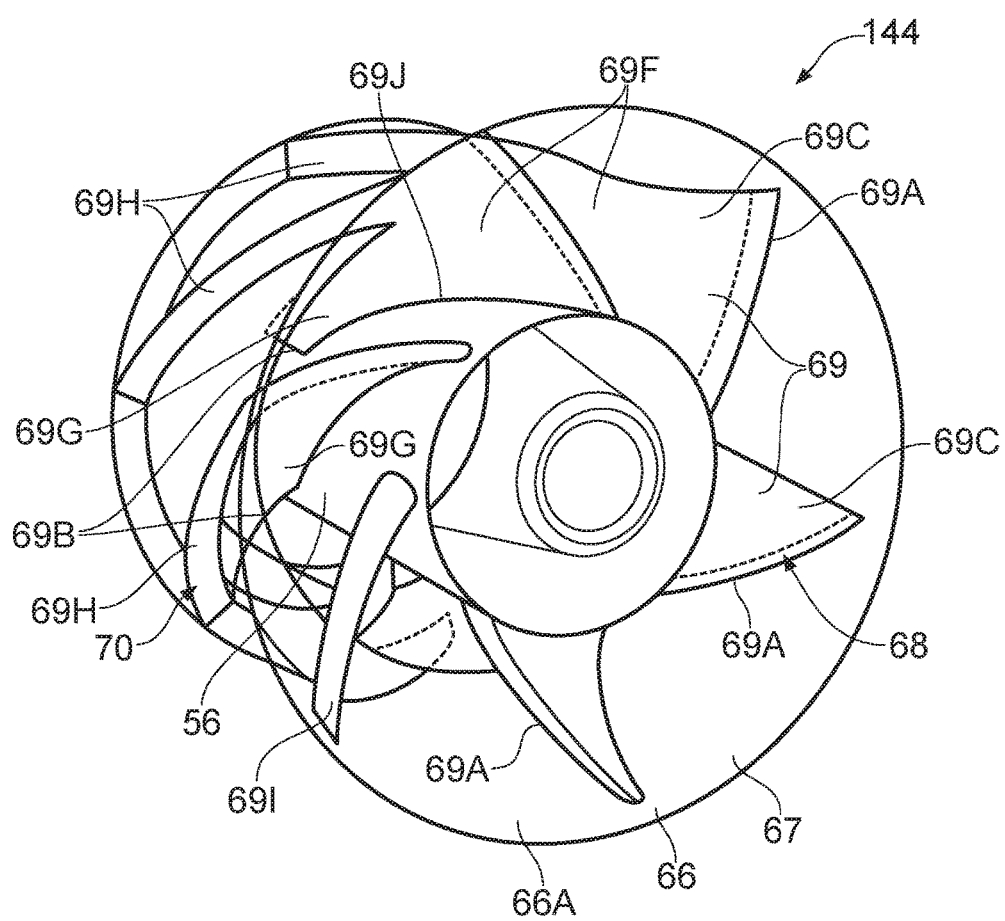
FIG. 8 is a cut-away perspective view of the inlet of fuel injector shown in FIG. 7.

A further fuel injector 144 according to the present disclosure is shown more clearly in FIGS. 7 and 8. The fuel injector 144 is substantially the same as the fuel injector 44 shown in FIGS. 3 to 6 and like parts ae denoted by like numerals. The second air swirler 68 again comprises a plurality of circumferentially, angularly, spaced vanes 69 extending radially from the first member 56 to the shroud 66 and from the first member 56 to the second member 64. Each vane 69 has a leading edge 69A, a trailing edge 69B, a pressure surface 69C extending from the leading edge 69A to the trailing edge 69B and a suction surface 69D extending from the leading edge 69A to the trailing edge 69B.

The vanes 69 extend axially from the upstream ends of the shroud 66 and first member 56 to a position upstream of the main fuel injector 72. There is a relatively small number of vanes 69 and the vanes 69 have a relatively long chord length and are relatively thick compared to the prior art vanes. In this example there are six vanes 69, but other suitable number of vanes 69 may be used, e.g. four, five, seven or eight. The radially outer ends 691 of the vanes 69 are circumferentially displaced relative to the radially inner ends 69J of the vanes 69. The fuel injector 144 differs in that each of the vanes 69 of the second air swirler 68 has a third portion 69H which extends into the annular passage 78 to form the vanes of the third air swirler 70, as seen more clearly in FIG. 8. Thus, each of the long chord length vanes 69 has a first, upstream, portion 69F, a second, downstream, portion 69G and a third portion 69H.

It is to be noted in this embodiment that the air flow in the second air swirler 68, the third air swirler 70 and the fourth air swirler 76 are all swirled in the same direction. The air flow through the first air swirler 58 may be arranged to swirl in the same direction or the opposite direction to the air flow through the second, third and fourth air swirlers 68, 70 and 76.

Figure 9:
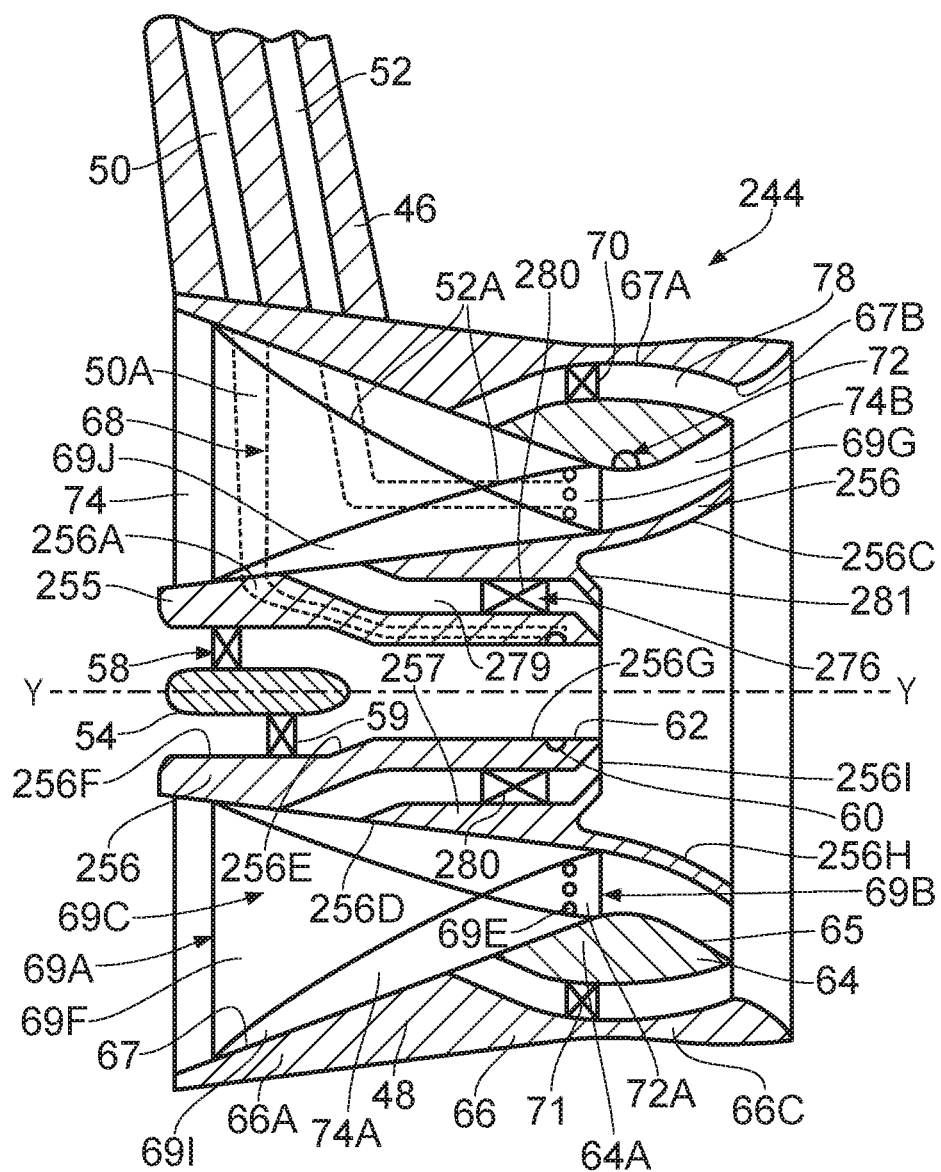
FIG. 9 is a further enlarged cross-sectional view through another fuel injector according to the present disclosure.

Another fuel injector 244 according to the present disclosure is shown more clearly in FIG. 9. The fuel injector 244 is substantially the same as the fuel injector 44 shown in FIGS. 3 to 6 and like parts ae denoted by like numerals. The fuel injector 244 differs in that although the first member 256 comprises an upstream portion 256A and a downstream portion 256C, the first member 256 has an annular passage 279. The annular passage 279 axially and radially separates the first member 256 into an inner portion 255 and an outer portion 257. The inner portion 255 has an extension extending coaxially through the outer portion 257 and the inner portion 255 has the pilot fuel injector 62 and the first fuel passage 50A. Additionally, the fourth air swirler 276 is provided in the annular passage 279 and the fourth air swirler 276 comprises a plurality of circumferentially, angularly, spaced vanes which extend radially between and interconnect the inner portion 255 and the outer portion 257 of the first member 256. The downstream end of the inner portion 255 has a conical outer surface and the outer portion 257 has a conical member 281 at the same axial position as the conical outer surface of the inner portion 255 to direct the air flow radially inwardly towards the axis Y.

It is to be noted in this embodiment that the air flow in the second air swirler 68 and the third air swirler 70 are swirled in the same direction. The air flow through the fourth air swirler 276 may be arranged to swirl in the same direction or the opposite direction to the air flow through the second and third air swirlers 68 and 70. The air flow through the first air swirler 58 may be arranged to swirl in the same direction or the opposite direction to the air flow through the fourth air swirler 276.

Figure 10:
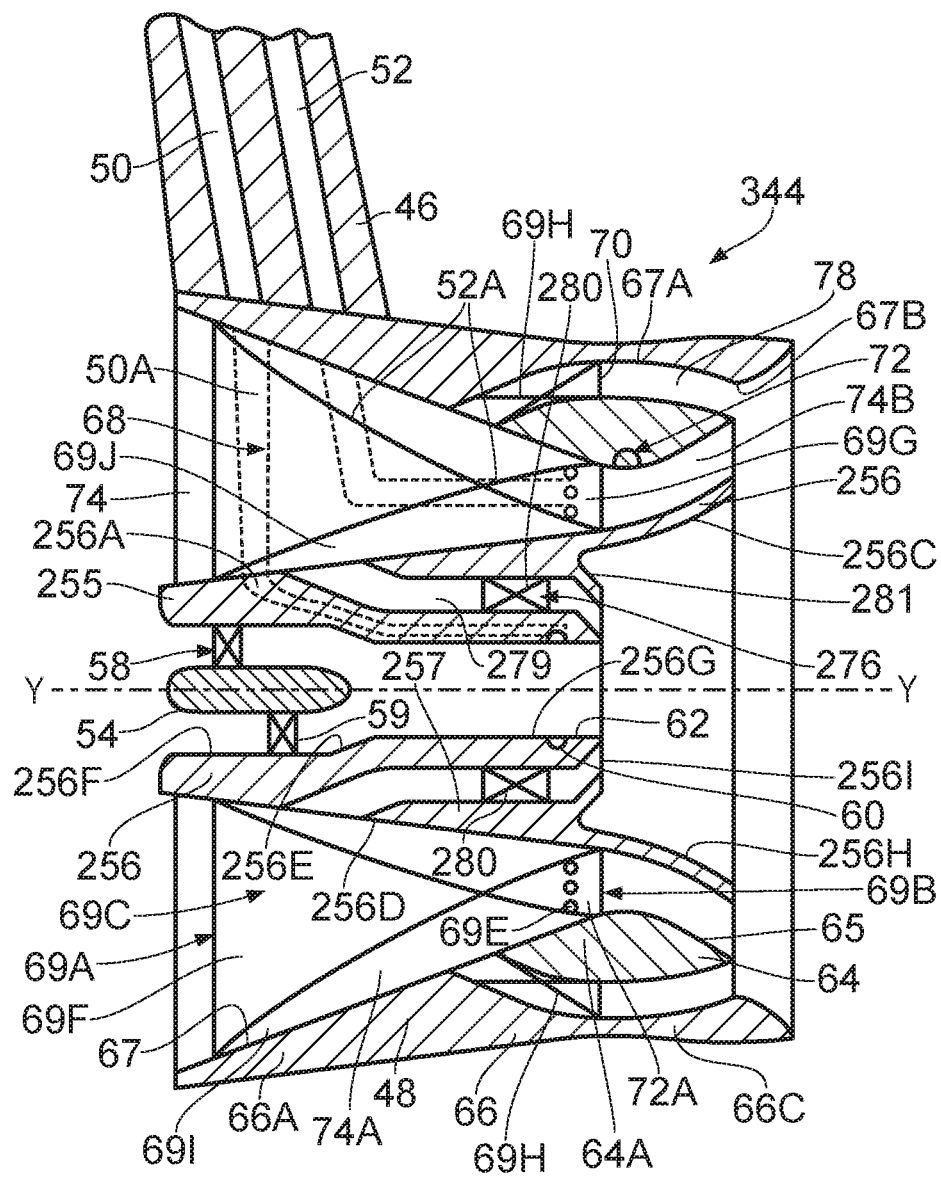
FIG. 10 is a further enlarged cross-sectional view through another fuel injector according to the present disclosure.

Another fuel injector 344 according to the present disclosure is shown more clearly in FIG. 10. The fuel injector 344 is substantially the same as the fuel injector 244 shown in FIG. 9, but the fuel injector 344 differs in that each of the vanes 69 of the second air swirler 68 has a third portion 69H which extends into the annular passage 78 to form the vanes of the third air swirler 70, as seen more clearly in FIG. 10. Thus, each of the long chord length vanes 69 has a first, upstream, portion 69F, a second, downstream, portion 69G and a third portion 69H.

It is to be noted in this embodiment that the air flow in the second air swirler 68 and the third air swirler 70 are swirled in the same direction. The air flow through the fourth air swirler 276 may be arranged to swirl in the same direction or the opposite direction to the air flow through the second and third air swirlers 68 and 70. The air flow through the first air swirler 58 may be arranged to swirl in the same direction or the opposite direction to the air flow through the fourth air swirler 276.

It is to be noted that in all the embodiments of the present disclosure that at the leading edges of the vanes of the second air swirler the cross-sectional area of the passages between each pair of adjacent vanes must be equal, so that the amount of air flowing into each of the passages is the same in order to ensure there is a uniform supply of air to the downstream end of the fuel injector to minimise, reduce, emissions.

It is to be noted that the number of thick, long chord vanes of the second air swirler may be varied and the length of the long chord vanes is varied accordingly in order to maintain the space to chord ratio. If the number of long chord vanes of the second air swirler is increased by one, then the length of the long chord vanes may be decreased to maintain the space to chord ratio and conversely if the number of long chord vanes of the second air swirler is reduced by one, then the length of the long chord vanes may be increased to maintain the space to chord ratio. Thus, the axial position of the leading edges of the long chord vanes may vary with the number and length of the long chord vanes of the second air swirler.

It is to be noted that the trailing edges of the long chord vanes of the second air swirler are generally positioned upstream, axially upstream, of the main fuel injector for embodiments where the main fuel injector is positioned in the second member. The trailing edges of the long chord vanes of the second air swirler are positioned downstream, axially downstream, of the main fuel injector for embodiments where the main fuel injector is positioned in the vanes of the second air swirler. The trailing edges of the long chord vanes remains may remain at a fixed axial position.

It is to be noted that the radially inner surface of the shroud changes from a generally elliptical cross-section in a plane perpendicular to the axis of the fuel injector at the upstream end of the shroud to a generally circular cross-section in a plane perpendicular to the axis of the fuel injector at the downstream end of the shroud. The axial position at which the radially inner surface of the shroud has changed to a generally circular cross-section may vary and the exact axial position is determined to minimise pressure gradients in the fuel injector.

The advantages of a fuel injector according to the present disclosure are that the long chord vanes of the second air swirler may be relatively thick, without creating excessive blockage, and thus the leading edges of the vanes may be made insensitive, or less sensitive, to the approach angle of the air and hence improve the off design performance of the fuel injector. Due to the use of longer, thicker and fewer vanes for the second air swirler the vanes are easier to manufacture and there is a reduction in parts count for the fuel injector. Due to the fact that the vanes of the second air swirler are thicker it is possible to provide a fuel passage from the fuel feed arm to the pilot fuel injector within a vane and hence to eliminate a main stem to the pilot fuel injector used in the prior art. Again due to the fact that the vanes of the second air swirler are thicker it is possible to provide fuel passages in the vanes of the second air swirler from the fuel feed arm and to effuse fuel from apertures in the pressure surfaces of the vanes to act as the main fuel injector and this dispenses with the need for a separate fuel pre-filming surface. The use of apertures in the pressure surfaces of the vanes to act as the main fuel injector also improves the fuel injector performance by using the parasitic vane frictional losses advantageous, i.e. by using the shear force to spread and atomise the main fuel. Hence the parasitic total pressure losses are minimised. Additionally, the use of apertures in the pressure surface of the vanes lengthens the time scale for evaporation and mixing of the main fuel which may improve the relight and smoke emission characteristics of the fuel injector. The air entering the main outer swirler passage is co-swirling, swirling in the same direction, with the air flowing through the main inner swirler passage. The advantage of this is that the air flowing through the main outer swirler passage may be used to control the vane secondary flow development and hence prevent separation of the airflow from the vanes. Additionally, the air entering the main outer swirler passage is pre-swirled and hence the amount of swirling to be provided by the air swirler in the main outer swirler passage is reduced and hence fewer vanes are required or the same number and type of vanes may be used to provide additional swirling. The use of the ports for the pilot outer swirler passage eliminates the need for small swirl vane geometries and hence simplifies the fuel injector arrangement.

The use of a few, thick, long chord vanes for the air swirler in the main inner swirler passage enable the fuel injector to simultaneously reduce the total pressure loss, improve reaction zone homogeneity and make the fuel injector less sensitive to the approaching air flow conditions. The thick, long chord vanes have thicker leading edges which makes them less sensitive to the approaching air flow conditions. The elliptical radially inner surface of the shroud in cross-section in a plane perpendicular to the axis of the fuel injector head at the upstream end of the shroud provides a more uniform flow of air into the fuel injector, better mixing of the fuel and air and hence lower emissions.

The radially inner surface of the shroud is generally circular in cross-section in a plane perpendicular to the axis of the fuel injector at the trailing edges of the vanes of the second air swirler. The radially inner and outer surfaces of the second member are generally circular in cross-section in a plane perpendicular to the axis of the fuel injector at the trailing edges of the vanes of the second air swirler. The radially outer surface of the first member is generally circular in cross-section in a plane perpendicular to the axis of the fuel injector at the trailing edges of the vanes of the second air swirler.

The fourth air swirler either comprises a plurality of passages extending though the first member and each passage extends with axial, radial and tangential components or comprises an annular passage extending through the first member and the annular passage has a plurality of swirl vanes.

Although the present disclosure has referred to the radially inner surface of the shroud being generally non-circular in cross-section in a plane perpendicular to the axis of the fuel injector at the upstream end of the shroud and has different dimensions in two mutually perpendicular directions, it may be possible to provide the radially inner surface of the shroud such that it is generally circular in cross-section in a plane perpendicular to the axis of the fuel injector at the upstream end of the shroud and in such circumstances the radially inner surface of the shroud being generally circular in cross-section in a plane perpendicular to the axis of the fuel injector from the upstream end to the downstream end of the fuel injector. This arrangement also produces an axial acceleration in the flow through the fuel injector head which helps to aerodynamically off-load the turning vanes.

Although the present disclosure has referred to a turbofan gas turbine engine, the present disclosure is equally applicable to a turbojet gas turbine engine, a turbo-shaft gas turbine engine or a turbo-propeller gas turbine engine. Although the present disclosure has referred to an aero gas turbine engine, the present disclosure is equally applicable to a marine gas turbine engine, an industrial gas turbine engine or an automotive gas turbine engine.

It will be understood that the invention is not limited to the embodiments above-described and various modifications and improvements can be made without departing from the concepts described herein. Except where mutually exclusive, any of the features may be employed separately or in combination with any other features and the disclosure extends to and includes all combinations and sub-combinations of one or more features described herein.

The invention claimed is:

1. A fuel injector, comprising:
a pilot fuel injector;
a main fuel injector; and
a plurality of air swirlers,
wherein:
the fuel injector has an axis,
a shroud is arranged around the pilot fuel injector, the main fuel injector and the plurality of air swirlers, the shroud has a radially inner surface,
a central member is arranged on the axis of the fuel injector,
a first member is arranged coaxially around the central member, the first member having a radially inner surface and a radially outer surface,
a first air swirler is arranged radially between the central member and the first member, the first air swirler extends from the central member to the radially inner surface of the first member,
the pilot fuel injector is arranged to supply fuel into a passage at least defined by the radially inner surface of the first member, a second member is arranged coaxially with and radially between a downstream portion of the first member and a downstream portion of the shroud, the second member having a radially inside surface and a radially outside surface, a second air swirler is arranged radially between an upstream portion of the first member and an upstream portion of the shroud and radially between a downstream portion of the first member and the second member, the second air swirler comprising a plurality of circumferentially spaced vanes, each of the vanes of the second air swirler extending radially from the radially outer surface of the upstream portion of the first member to the radially inner surface of the upstream portion of the shroud and from the radially outer surface of the downstream portion of the first member to the radially inside surface of the second member, and a third air swirler is arranged radially between the downstream portion of the shroud and the second member, the main fuel injector arranged to supply the fuel into an annular passage defined between the first member and the second member and a fourth air swirler extending through the first member.

2. A fuel injector as claimed in claim 1 wherein the radially inner surface of the shroud is generally circular in cross-section in a plane perpendicular to the axis of the fuel injector at a downstream end of the shroud, the radially inner surface of the shroud is generally non-circular in cross-section in a plane perpendicular to the axis of the fuel injector at an upstream end of the shroud and has different dimensions in two mutually perpendicular directions.

3. A fuel injector as claimed in claim 2 wherein the radially inner surface of the shroud is generally elliptical, oval, kidney shaped, oblong or rectangular in cross-section in a plane perpendicular to the axis of the fuel injector at the upstream end of the shroud.

4. A fuel injector as claimed in claim 2 wherein the radially inner surface of the shroud changes from being circular in cross-section in a plane perpendicular to the axis of the fuel injector at the downstream end of the shroud to being generally non-circular in cross-section in a plane perpendicular to the axis of the fuel injector at the upstream end of the shroud.

5. A fuel injector as claimed in claim 2 wherein the radially inner surface of the shroud is generally circular in cross-section in a plane perpendicular to the axis of the fuel injector at an inlet to an annular passage formed between the second member and the downstream end of the shroud.

6. A fuel injector as claimed in claim 5 wherein the radially inner surface of the shroud changes from being circular in cross-section in a plane perpendicular to the axis of the fuel injector at the inlet to the annular passage formed between the second member and the downstream end of the shroud to being generally non-circular in cross-section in a plane perpendicular to the axis of the fuel injector at the upstream end of the shroud.

7. A fuel injector as claimed in claim 1 wherein an upstream end of the shroud and an upstream end of the first member are arranged in a common plane perpendicular to the axis of the fuel injector.

8. A fuel injector as claimed in claim 1 wherein each of the vanes extend axially from the upstream portion of the shroud and first member to a position upstream of the main fuel injector.

9. A fuel injector as claimed in claim 1 wherein there are a relatively small number of the vanes and the vanes are relatively thick.

10. A fuel injector as claimed in claim 9 wherein there are six of the vanes.

11. A fuel injector as claimed in claim 1 wherein radially outer ends of the vanes are circumferentially displaced relative to radially inner ends of the vanes.

12. A fuel injector as claimed in claim 1 wherein one of the vanes has a second passage extending there-through to supply the fuel to the main fuel injector.

13. A fuel injector as claimed in claim 12 wherein all of the vanes have a second passage extending there-through to supply the fuel to the main fuel injector.

14. A fuel injector as claimed in claim 12 wherein the main fuel injector is arranged to supply the fuel onto the inside surface of the second member.

15. A fuel injector as claimed in claim 12 wherein each of the vanes have apertures in the pressure surface to act as the main fuel injector.

16. A gas turbine engine combustion chamber having at least one of the fuel injector as claimed in claim 1.

17. A fuel injector as claimed in claim 1 wherein a diameter of the radially outer surface of the first member increases from an upstream end to a downstream end of the first member.

18. A fuel injector as claimed in claim 1 wherein one of the vanes has a first passage extending radially there-through to supply the fuel to the pilot fuel injector.

19. A fuel injector as claimed in claim 1 wherein the fourth air swirler comprises a plurality of ports extending through the first member.

20. A fuel injector as claimed in claim 19 wherein the ports have inlets arranged tangentially to the outer surface of the first member and the ports extend with axial and circumferential components through the first member.

21. A fuel injector as claimed in claim 1 wherein the third air swirler comprises a portion of each of the vanes of the second air swirler, the portion of each of the vanes of the second air swirler is arranged between the downstream portion of the shroud and the second member, the portion of each of the vanes of the second air swirler extending radially from the downstream portion of the shroud to the second member.

22. A fuel injector comprising:
a pilot fuel injector;
a main fuel injector; and
a plurality of air swirlers,
wherein:
a shroud is arranged around the pilot fuel injector, the main fuel injector and the plurality of air swirlers, the fuel injector has an axis, the shroud has a radially inner surface,
a central member is arranged on the axis of the fuel injector,
a first member is arranged coaxially around the central member,
a first air swirler is arranged radially between the central member and the first member, the first air swirler extending radially from the central member to the first member,
the pilot fuel injector is arranged within the first member to supply fuel into a passage at least defined by the first member,
a second member is arranged coaxially between a downstream portion of the first member and a downstream portion of the shroud, a second air swirler is arranged radially between an upstream portion of the first member and an upstream portion of the shroud and radially between a downstream portion of the first member and the second member, the second air swirler comprising a plurality of circumferentially spaced vanes, each of the vanes of the second air swirler extending radially from the upstream portion of the first member to the upstream portion of the shroud and from the downstream portion of the first member to the second member, a third air swirler is arranged radially between the downstream portion of the shroud and the second member, the third air swirler extending radially between the downstream portion of the shroud and the second member, the main fuel injector arranged to supply the fuel into an annular passage between the first member and the second member and a fourth air swirler extending through the first member, and one of the vanes has a first passage extending radially there-through to supply the fuel to the pilot fuel injector.

23. A fuel injector comprising:
a pilot fuel injector;
a main fuel injector; and
a plurality of air swirlers,
wherein:
a shroud is arranged around the pilot fuel injector, the main fuel injector and the plurality of air swirlers, the fuel injector has an axis, the shroud has a radially inner surface,
a central member is arranged on the axis of the fuel injector,
a first member is arranged coaxially around the central member,
a first air swirler is arranged radially between the central member and the first member, the first air swirler extending radially from the central member to the first member,
the pilot fuel injector is arranged within the first member to supply fuel into a passage at least defined by the first member,
a second member is arranged coaxially between a downstream portion of the first member and a downstream portion of the shroud,
a second air swirler is arranged radially between an upstream portion of the first member and an upstream portion of the shroud and radially between a downstream portion of the first member and the second member, the second air swirler comprising a plurality of circumferentially spaced vanes, each of the vanes of the second air swirler extending radially from the upstream portion of the first member to the upstream portion of the shroud and from the downstream portion of the first member to the second member,
a third air swirler is arranged radially between the downstream portion of the shroud and the second member, the third air swirler extending radially between the downstream portion of the shroud and the second member, the main fuel injector arranged to supply the fuel into an annular passage between the first member and the second member and a fourth air swirler extending through the first member, and the fourth air swirler comprises a plurality of ports extending through the first member.

24. A fuel injector comprising:
a pilot fuel injector;
a main fuel injector; and
a plurality of air swirlers,
wherein:
a shroud is arranged around the pilot fuel injector, the main fuel injector and the plurality of air swirlers, the fuel injector has an axis, the shroud has a radially inner surface,
a central member is arranged on the axis of the fuel injector,
a first member is arranged coaxially around the central member,
a first air swirler is arranged radially between the central member and the first member, the first air swirler extending radially from the central member to the first member,
the pilot fuel injector is arranged within the first member to supply fuel into a passage at least defined by the first member,
a second member is arranged coaxially between a downstream portion of the first member and a downstream portion of the shroud,
a second air swirler is arranged radially between an upstream portion of the first member and an upstream portion of the shroud and radially between a downstream portion of the first member and the second member, the second air swirler comprising a plurality of circumferentially spaced vanes, each of the vanes of the second air swirler extending radially from the upstream portion of the first member to the upstream portion of the shroud and from the downstream portion of the first member to the second member,
a third air swirler is arranged radially between the downstream portion of the shroud and the second member, the third air swirler extending radially between the downstream portion of the shroud and the second member, the main fuel injector arranged to supply the fuel into an annular passage between the first member and the second member and a fourth air swirler extending through the first member, and wherein the third air swirler comprises a portion of each of the vanes of the second air swirler, the portion of each of the vanes of the second air swirler is arranged between the downstream portion of the shroud and the second member, the portion of each of the vanes of the second air swirler extending radially from the downstream portion of the shroud to the second member.

* * * * *